United States Patent Office 3,641,240
Patented Feb. 8, 1972

3,641,240
METHOD FOR THE TREATMENT OF AN EMBOLUS OR THROMBUS
Alan C. Hymes, Hopkins, Minn., and Rajko R. Margulis and Robert M. Nalbandian, Bloomfield Hills, Mich., assignors to Wyandotte Chemicals Corporation
No Drawing. Filed Sept. 27, 1968, Ser. No. 763,371
Int. Cl. A61k 27/00
U.S. Cl. 424—78                                 8 Claims

ABSTRACT OF THE DISCLOSURE

Prevention of thrombosis in a blood vessel and re-establishment of the microcirculation through a thrombosed blood vessel are accomplished by introducing into the blood stream of a body an effective amount of solutions of polyoxyethylene polyoxypropylene block copolymers.

---

The present invention relates to a method of preventing the growth of and/or dissemination of an obstruction in a blood vessel (a thrombus or an embolus). More particularly, the invention relates to the use of solutions of polyoxyethylene polyoxypropylene block copolymers in the treatment of a thrombus or an embolus.

An obstructing thrombus or embolus in the blood vessel is generally caused by platelets and/or other cellular material of the blood adhering at the site of an injury or a foreign particle such as fat, gas, or amniotic debris in the blood. More platelets then cohere to each other, resulting in a thrombus large enough to cause an obstruction of the blood flow through the vessel. When such an obstruction occurs, it is of extreme importance that it be treated immediately so that re-establishment of the microcirculation through the obstructed vessel is effected without causing further hemorrhage at the site of the injury.

It is an object of the present invention to provide a method for the treatment of a thrombus and/or an embolus resulting in rapid re-establishment of the microcirculation through an obstructed vessel. A further object of the present invention is to provide a method of disseminating the aggregation of a platelet thrombosis and/or cellular material of blood around an embolus. Still another object of the present invention is to provide a method of preventing the formation of platelet aggregation around an embolus such as a gas bubble, amniotic fluid debris, or a blood clot. These and other objects of the present invention will be apparent from the specification and examples which follow.

The above objects of the present invention are accomplished by adding to the blood stream solutions of certain polyoxyethylene polyoxypropylene block copolymers. It was surprising and unexpected to find that these solutions possess anticoagulant properties.

The solutions which are employed in the present invention comprise a compound of the formula

wherein $a$ is an integer such that the hydrophobe represented by $(C_3H_6O)$ has a molecular weight of at least 950 and $b$ is an integer such that the hydrophile portion represented by $(C_2H_4O)$ constitutes about 50% to 90% by weight of the compound, dissolved in a solution having an osmolarity of 270 to 350 or higher. Solutions having osmotic concentrations of at least 270 are well known in the art as illustrated by saline (a solution of sodium chloride containing 8.5 to 9.5 grams of salt in 1000 cc. of purified water), Ringer's solution, lactated Ringer's solution, Krebs Ringer's solution, and various sugar solutions. The osmolarity of a solution is defined as osmoles of solute per liter of solution.

The block copolymers which are operable in the present invention are prepared by condensing ethylene oxide with polypropylene glycol. A more detailed discussion of the preparation of these products is found in U.S. 2,674,619. To be useful in the present invention, the products must contain at least 50% by weight of ethylene oxide. Furthermore, the polypropylene glycol base must have a molecular weight of at least 950. It has been determined that products outside of these limits are not satisfactory when employed in the practice of the present invention. For example, a product containing less than 50% ethylene oxide or a product containing a hydrophobic base molecular weight of less than about 950 apparently have physical properties which render them inapplicable and of little or no value in the present invention.

Illustrative ethylene oxide-polypropylene glycol condensation products which may be employed in the preparation of solutions useful in the present invention include:

(1) 4750 molecular weight polyol containing approximately 80% by weight ethylene oxide,
(2) 3500 molecular weight polyol containing approximately 50% by weight ethylene oxide,
(3) 7800 molecular weight polyol containing approximately 80% by weight ethylene oxide,
(4) 7500 molecular weight polyol containing approximately 70% by weight ethylene oxide,
(5) 16,250 molecular weight polyol containing approximately 80% by weight ethylene oxide,
(6) 13,330 molecular weight polyol containing approximately 70% by weight ethylene oxide,
(7) 9500 molecular weight polyol containing approximately 90% by weight ethylene oxide.

The concentrations of the solutions of the present invention may vary depending on the solubility of the block copolymer employed in the particular solution. The total amount of block copolymer employed in the treatment of an embolus in accordance with the present invention will also vary depending on the size and type of the embolus, the particular copolymer employed, and whether it is a preventive or eliminative treatment. Generally, however, the total amount of copolymer employed will be about 15 to 1000 milligrams per kilogram of body weight. The total amount of solution employed is such as to provide the above-stated amounts of copolymer and is an amount effective to prevent the growth of or to disseminate an embolus.

The solutions of the present invention may be employed by admixing with blood in any standard manner. Preferably, however, the solutions are intravenously injected into the blood stream. The solutions are generally admixed with the blood in a manner so as to maintain a substantially steady venous pressure.

In one embodiment of the present invention, the above-described solutions are intravenously injected into a blood stream prior to surgery or immediately after an injury occurs. The presence of these solutions in the blood stream greatly reduces the tendency of platelets to cohere and thus substantially prevents the formation of an embolism and/or a thrombus.

The following examples serve to illustrate the invention. All parts are by weight unless otherwise specified.

EXAMPLE I

A solution containing 4.8 milliosmoles (10 grams per liter) of a 7800 molecular weight polyol prepared by condensing ethylene oxide with a polypropylene glycol having a molecular weight of 1750, said polyol containing approximately 80% by weight ethylene oxide, dissolved in normal saline solution (osmolarity of 310) was prepared. Normal saline solution is a solution of sodium chloride containing 8.5 to 9.5 grams of sodium chloride in 1000 cc. of purified water. The solution was then employed as described below in the study of microcirculation in the mesentery of rabbits with cinemicrophotography.

A blood vessel in the mesentery of a three kilogram rabbit was injured by puncturing with a microneedle. Cinemicrophotography indicated that a blood clot (thrombus) had formed at the site of the injury. The clot grew to such a size the blood circulation was halted. At this point, an intravenous injection of the above-described copolymer solution was administered to the rabbit. The total amount of copolymer injected was 500 mg. Cinemicrophotography and direct visual observation indicated that the microcirculation through the obstructed blood vessel was reestablished within minutes after injection. Moreover, the solution which was effective in disseminating the thrombus did not disseminate the small platelet aggregation at the site of the injury, thus avoiding hemorrhage.

The above test was repeated 30 times, varying the nature of the injury and the amount of copolymer employed. The total amount of copolymer employed varied from 15 to 1000 mg. per kg. weight. The rate of addition was such as to maintain constant venous pressure. In all cases where the solution was injected into the blood stream of the rabbits within 20 minutes after injury, the microcirculation of the obstructed vessel was reestablished.

EXAMPLE II

In this test, 500 mg. of the block copolymer described in Example I in a saline solution was injected into the blood stream of a rabbit ten minutes prior to the time the blood vessel was punctured. Visual observation and cinemicrophotography indicated that platelets adhered to the site of the injury. However, the thrombus did not enlarge and the blood flow continued uninterrupted. Thus, the solution of the present invention was effective in preventing an obstruction or occlusion of the blood vessel.

EXAMPLE III

The procedure of Example I is duplicated with the single exception that a solution containing 4.8 milliosmoles of a polyol having a molecular weight of about 16,250 and containing approximately 80% by weight ethylene oxide, prepared by the reaction of ethylene oxide with a polyoxypropylene glycol having a molecular weight of 3250, dissolved in Ringer's lactate (osmolarity of 285) is employed in the study of microcirculation in the mesentery of rabbits. Ringer's lactate is a solution of 570 to 630 mg. sodium chloride, 290 to 330 mg. sodium lactate, 18 to 22 mg. calcium chloride, and 27 to 33 mg. potassium chloride in each 100 cc. of distilled water. Results substantially identical to those described in Example I are obtained.

EXAMPLE IV

The solution prepared as described in Example I was employed in a study of the treatment of amniotic fluid embolism in the mesentery of rabbits with cinemicrophotography. Amniotic fluid debris was injected into the blood stream of a rabbit. Within 30 seconds cinemicrophotography and visual observation indicated that the microcirculation through the obstructed vessel of the rabbit had stopped, blood pressure had decreased, and death occurred.

The test was repeated, but this time the saline solution described in Example I was injected into the blood stream of a rabbit within five minutes after blood circulation stopped. The total amount of copolymer injected was 500 mg. Within minutes, cinemicrophotography and visual observation indicated that (1) microcirculation through the obstructed vessel had been reestablished and (2) the blood pressure of the rabbit had been restored. The above test was repeated fifteen times, varying the injury and the amount of copolymer employed. The total amount of copolymer employed varied from 15 to 1000 mg. per kg. weight. The rate of addition was such as to maintain constant venous pressure. In all cases in which the solution was injected into the blood stream of the rabbits within ten minutes after administration of the amnioic fluid debris, the microcirculation of the obstructed vessel was re-established and the blood pressure of the rabbit restored.

EXAMPLE V

In this test 500 mg. of the block copolymer described in Example I in a normal saline solution was injected into the blood stream of a rabbit five minutes prior to the time when the amniotic fluid debris was injected into the rabbit. Cinemicrophotography indicated that the microcirculation through the blood vessel and the blood pressure of the rabbit were maintained. Thus, the solution of the present invention was effective in preventing an obstruction or occlusion of the blood vessel.

EXAMPLE VI

A solution of the polyol described in Example I in Ringer's lactate was employed to prevent platelet thrombosis and to disseminate thrombus already present in an injured extremity of a human being. The extremity was an arm of a human which had been amputated by a press and which had been reattached to the body. Four to twelve grams of the polyol in Ringer's lactate were administered to the patient for a period of ten days. A radioisotope study of the blood circulation indicated that circulation of the blood through the injured extremity was improved during the time of the treatment.

EXAMPLE VII

This example demonstrates by in vitro tests on human blood the anticoagulant properties of the solutions employed in the present invention. The test employed in this example was the Lee-White test first described in "A Clinical Study of Coagulation Time of Blood," American Journal of the Medical Society, volume 145, page 495 (1913), modified to the extent that saline solution was added to the control in order that the volume of the control and of the test samples would be the same. Briefly, the Lee-White test involves adding 1 ml. of human blood to a glass test tube and tilting the tube until the blood clots. In the first test, 0.1 ml. of a saline solution was added to three tubes containing 1 ml. of blood, and the time in which the blood clotted in each tube was averaged and recorded. Thereafter 0.1 ml. of a 1% solution and a 5% solution of the polyol described in Example I in saline were added to three tubes containing 1 ml. of blood, and the time which the blood clotted in each tube was averaged and recorded. The above tests were repeated with the single exception that siliconized test tubes were employed. The results of these tests are presented in Table I.

TABLE I

|  | Glass tubes, time, seconds | Siliconized tubes, time, seconds |
| --- | --- | --- |
| Control | 347 | 673 |
| 1% solution | 418 | 862 |
| 5% solution | 488 | 957 |

Further indications of the anticoagulant properties of the solutions employed in the present invention have been obtained by a measurement of the (1) partial thromboplastin time as described by N. F. Rodman, E. M. Barrow, and J. B. Graham, "Diagnosis and Control of the Hemophilioid States With the Partial Thromboplastin Time (PTT) Test," Am. J. Clinical Pathology, 29, page 525 (1956), (2) Factor 8 Activity as described by R. D. Langdell, R. H. Wagner, and K. N. Brinkhous, "Effect of Antihemophilic on One State Clotting Test," J. Lab. and Clinical Med., 41, page 637 (1953), and (3) Thromboelastogram as described by P. De Nicola, Thromboelastography, Charles C. Thomas, publisher (1957).

All of the above-mentioned tests were carried out on human blood. The tests indicate that the solutions employed in the present invention demonstrate anticoagulant properties, thus rendering them useful in the treatment of a thrombus and/or an embolus.

In the PTT test, a 2% solution of the polyol described in Example I in saline increased the partial thromboplastin time from 40.6 seconds for the control to 51.5 seconds, while a 5% solution increased the time to 53.8 seconds.

In the Factor 8 Activity test, the control recorded 90% of normal while a 2% solution of the polyol described in Example I in saline recorded 76% of normal and a 5% solution of the polyol described in Example I in saline recorded 74% of normal.

Thromboelastogram readings clearly demonstrate that, when admixed with human blood, the solutions employed in the present invention prolong the time with clotting commences and decrease the maximum amplitude of clot formation which could result from inability of the platelets to aggregate and function normally in the clotting mechanisms.

Results substantially similar to those described above have been obtained by preliminary in vivo tests on dogs. It is to be understood that the invention described and exemplified herein is applicable to all living animal bodies. Representative of such living animal bodies are human beings; domesticated animals such as dogs, cats, horses, cows, and pigs; and undomesticated animals such as rabbits, chimpanzees, and monkeys.

What is claimed is:

1. A method of treating blood to prevent the growth of or to disseminate the growth of a thrombus generally caused by platelets and other cellular material of the blood adhering at the site of an injury or to a foreign particle comprising incorporating therewith an amount effective to prevent the growth of or to disseminate a thrombus, of an aqueous solution, having an osmolarity of 270 to 350, of a block copolymer represented by the formula $$HO(C_2H_4O)_b(C_3H_6O)_a(C_2H_4O)_bH$$

wherein $a$ is an integer such that the hydrophobe represented by $(C_3H_6O)$ has a molecular weight of from 1750 to 4000 and $b$ is an integer such that the hydrophile portion represented by $(C_2H_4O)$ constitutes about 50% to 90% by weight of the copolymer.

2. The method of claim 1 wherein $b$ is an integer such that the hydrophile represented by $(C_2H_4O)$ constitutes approximately 80% by weight of the copolymer.

3. The method of claim 1 wherein the block copolymer is dissolved in saline solution.

4. A method of treating a living animal body to prevent the growth or formation of or to disseminate the growth of an embolus or thrombus generally caused by platelets and other cellular material of the blood adhering at the site of an injury or to a foreign particle comprising introducing into the blood stream of the body an amount effective to prevent the growth or formation of or to disseminate an embolus or thrombus, of an aqueous solution, having an osmolarity of 270 to 350, of a block copolymer represented by the formula $$HO(C_2H_4O)_b(C_3H_6O)_a(C_2H_4O)_bH$$

wherein $a$ is an integer such that the hydrophobe represented by $(C_3H_6O)$ has a molecular weight of from 1750 to 4000 and $b$ is an integer such that the hydrophile portion represented by $(C_2H_4O)$ constitutes about 50% to 90% by weight of the copolymer.

5. The method of claim 4 wherein the embolus is amniotic fluid debris.

6. The method of claim 4 wherein the thrombus is a blood clot.

7. The method of claim 4 wherein $b$ is an integer such that the hydrophile represented by $(C_2H_4O)$ constitutes approximately 80% by weight of the copolymer.

8. The method of claim 4 wherein the block copolymer is dissolved in saline solution.

References Cited

UNITED STATES PATENTS

| | | | |
|---|---|---|---|
| 2,945,869 | 7/1960 | Meyer | 424—342 |
| 3,202,578 | 8/1965 | Parker | 424—78 |

ALBERT T. MEYERS, Primary Examiner

F. E. WADDELL, Assistant Examiner

U.S. Cl. X.R.

424—342